(12) United States Patent
Garios

(10) Patent No.: US 9,260,321 B2
(45) Date of Patent: *Feb. 16, 2016

(54) FILTER SEPERATOR AND ADAPTER FOR RAINWATER VOLUME

(76) Inventor: Wadih Antonio Garios, Juiz de Fora (BR)

( * ) Notice: Subject to any disclaimer, the term of this patent is extended or adjusted under 35 U.S.C. 154(b) by 288 days.

This patent is subject to a terminal disclaimer.

(21) Appl. No.: 13/881,539

(22) PCT Filed: Nov. 1, 2011

(86) PCT No.: PCT/BR2011/000406
§ 371 (c)(1),
(2), (4) Date: Apr. 25, 2013

(87) PCT Pub. No.: WO2012/058739
PCT Pub. Date: May 10, 2012

(65) Prior Publication Data
US 2013/0220904 A1 Aug. 29, 2013

(30) Foreign Application Priority Data
Nov. 4, 2010 (BR) .................................. 9002224 U

(51) Int. Cl.
*E03B 3/02* (2006.01)
*E04D 13/04* (2006.01)
*C02F 1/00* (2006.01)
*B01D 33/80* (2006.01)
*B01D 29/11* (2006.01)
*E04D 13/076* (2006.01)
*E03B 1/04* (2006.01)

(52) U.S. Cl.
CPC .............. *C02F 1/004* (2013.01); *B01D 29/118* (2013.01); *B01D 33/802* (2013.01); *E03B 1/041* (2013.01); *E03B 3/02* (2013.01); *E04D 13/0767* (2013.01); *E03B 2001/047* (2013.01)

(58) Field of Classification Search
CPC ......... E03B 1/041; E03B 1/042; E03B 1/048; E03B 3/02; E03B 2001/047; E04D 13/076; E04D 13/0767; B01D 29/0034; B01D 29/118; B01D 33/802; B01D 35/02
USPC ......... 210/747.3, 780, 155, 156, 162, 170.03, 210/328, 344, 359, 433.1, 461; 52/12, 16
See application file for complete search history.

(56) References Cited

U.S. PATENT DOCUMENTS

| | | | | |
|---|---|---|---|---|
| 565,858 A * | 8/1896 | Fowler | ............. | 210/328 |
| 1,892,039 A * | 12/1932 | Demaree | ............. | 210/433.1 |
| 2,463,814 A * | 3/1949 | Skinner | ............. | 210/433.1 |
| 4,801,377 A * | 1/1989 | Bolt | ............. | 210/162 |
| 5,114,594 A * | 5/1992 | Rosebrock et al. | ............. | 52/12 |
| 5,709,051 A * | 1/1998 | Mazziotti | ............. | 52/12 |
| 7,550,077 B2 * | 6/2009 | Graf | ............. | 210/170.03 |
| 8,033,058 B2 * | 10/2011 | Block | ............. | 52/12 |
| 2012/0222998 A1 * | 9/2012 | Pierzchalski | ............. | 210/170.03 |
| 2013/0220901 A1 * | 8/2013 | Garios | ............. | 210/86 |

* cited by examiner

Primary Examiner — Christopher Upton
(74) Attorney, Agent, or Firm — Nevrivy Patent Law Group P.L.L.C.

(57) ABSTRACT

A filter that separates and adapts to the volume of rainwater based on the adaptability of the variations of the volume of rain, being self-cleaning and eliminating the debris from the piping, made of a pipe (3) connected by the entrance (4) and to the filter that separates and adapts to rainwater's volume. Here the filters (10), (11) and (13) move, programmed by the calibrator (5), to adapt and absorb the largest volume of rain possible (6), eliminating the rubbish (15) through the exit (14) and guiding the water (6) to the exit (7).

8 Claims, 1 Drawing Sheet

FILTER SEPERATOR AND ADAPTER FOR RAINWATER VOLUME

FIELD OF THE INVENTION

The present invention refers to a filter separator and adapter for rainwater volume, which captures, separates and adapts to the amount of rainfall recovered from roofs, roof tops and large areas where rain is collected, which, thanks its special innovative features, construction, and use, manages to stand out in a most practical and efficient way.

The filter separator and adaptor for rainwater volume separates and deflects debris, while having a characteristic of being able to adjust, move and adapt to capture the many variations of rainfall volume, while also being able to eliminate all surface waste from the system which is larger than its mesh dimensions, accurately eliminating impurities which are caught in catchments, while at the same time aiming to improve development of the next stages of equipment that may eventually come to be used.

BACKGROUND OF THE INVENTION

The water from first rainfalls has a high concentration of dirt that has accumulated over time, which is carried by rain to the collection system, causing damage to its equipment, its components and possibly to the health of those who consume this water.

There are currently several processes to gather and reuse rainwater. In the simplest processes, the first rainwater is collected directly by the cistern, and in other processes, is diverted manually until appearing clean to the naked eye, and then redirected immediately to the point of use.

In places where technology is available, multiple filter models are used which grasp leaves, small animals, and waste in their mesh, which may become dirty and clogged, and therefore unable to fully absorb the water since these systems are not self-cleaning. Other systems, although they are self-cleaning, cause wasting of water because they do not adapt to rain volume. As such, they do not capture the total flow of rainwater.

SUMMARY OF THE INVENTION

With a view of solving the problems mentioned above, as well as many other existing problems, and in order to overcome them, a filter separator and adapter was developed for rainwater volume, object of the present invention, which has features that allow improved absorption of rainwater, which provides better use. The present invention is also self-cleaning, which prevents the concentration of waste and eliminates the risk of contamination of the water.

This filter has the special feature of being able to adapt to peaks and variations in rainfall and rain volume by moving, expanding or contracting, thereby eliminating in this process all extraneous debris, and far exceeds the rain catchment capabilities of existing traditional systems.

BRIEF DESCRIPTION OF THE DRAWINGS

The filter separator and adapter for rainwater volume, object of the present invention, may be better understood from the following detailed description, in accordance with the attached figures.

DETAILED DESCRIPTION OF THE INVENTION

Figure 1:
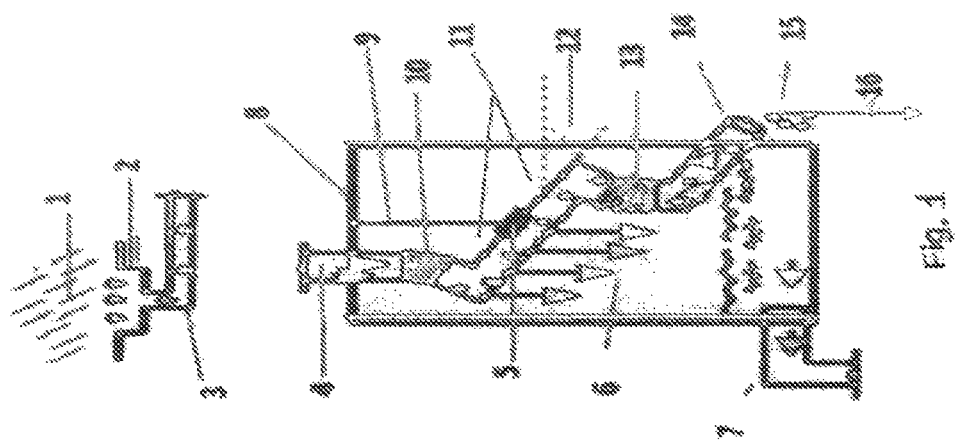
FIGS. 1, 2 and 3 show a lateral view with an indication of water in the system design in order to compose the utility model patent.

The filter separator and adaptor for rainwater volume comprises a set of parts, wherein incoming rainwater 3 from catchments or collectors such as roofs, roofing, etc., passes through a duct, which directs the flow of rainwater to the filter separator and adapter for rainwater volume 8. The collected rainwater 3 mingles with waste, formed by debris, dirt, etc., deposited over time on the collectors, passes through a rainwater inlet 4, to enter into the filter separator and adapter 8. The rainwater inlet 4 is connected to a filtering device comprising three filter elements; first, second and third filter elements (10, 11, 13), which are connected together in this sequence. A waste outlet 14 is connected to the third filter element 13. The first, second and third filter elements (10, 11, 13) have walls made of a screen mesh which allows the rainwater 3 to pass through the interstices of the mesh, and a flow of filtered rainwater 6 drops into the bottom of the filter separator and adapter for rainwater volume 8, where it is drained by a filtered rainwater outlet 7. The continuous flow of rainwater 3 urges waste 15 retained inside the first, second and third filter elements (10, 11, 13) towards the waste outlet 14, where it is discarded. A small volume of discarded water 16 which is mingled with waste 15 is also discarded. The first filter 10 and the third filter 13 can articulate, expand or retract according to the flow rate of rainwater 3 passing through them. A tilting calibrator 5 is provided in the upper part of the second filter element 11, and is pivotally connected to an end of a rod 9. The other end of the rod 9 is pivotally connected to the upper part of the filter separator and adapter for rainwater volume 8. The assembly formed by the tilting calibrator 5, rod 9 and the first, second and third filter elements (10, 11, 13) is designed to adapt to the flowrate of rainwater 3, according to its calibration.

During periods of heavy peak rainfall, the second filter (11) which is attached to the rod, (9) adapts to the flow of water through changes in its angle of inclination 12, thereby expanding the filters (10) and (13), and increasing their filtering area to filter the maximum possible volume of rainwater 3. See FIGS. 1, 2 and 3 respectively associated with increased rain flow.

Figure 2:
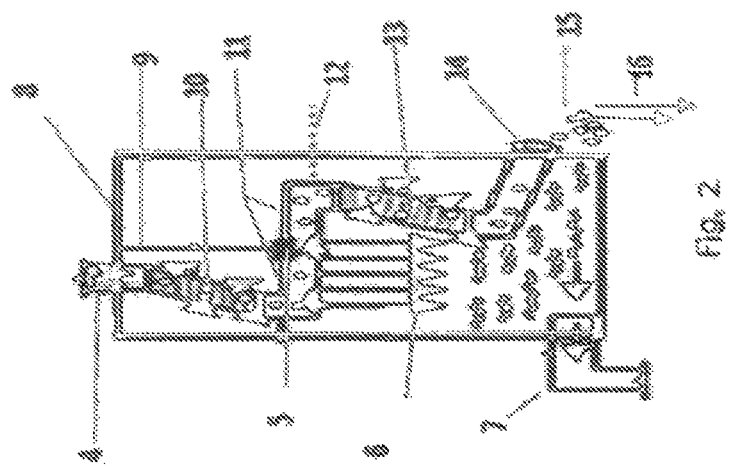

The position of the first, second and third filter elements (10, 11, 13) is initially calculated to facilitate expulsion of waste 15 from the filtering device. The first, second and third filter elements (10, 11, 13) have a steeper slope when there is a weak rainfall which facilitates the exit of waste 15 (FIG. 1). This position changes in proportion to the increase of rain, moving to the position of FIG. 2, and may gradually reach the position of FIG. 3, depending on the flow of rainfall, by tilting, in order to yield the maximum filtering of rainwater. When the flow of rainwater 3 reduces, at a later time, the second filter 11 starts to return to the initial programmed position, and the first and third filters (10, 13) begin to collapse, proportionally increasing the angle of inclination 12 of the second filter element 11. Consequently, waste 15 is disposed containing a smaller volume of discarded water 16 (FIG. 1).

Figure 3:
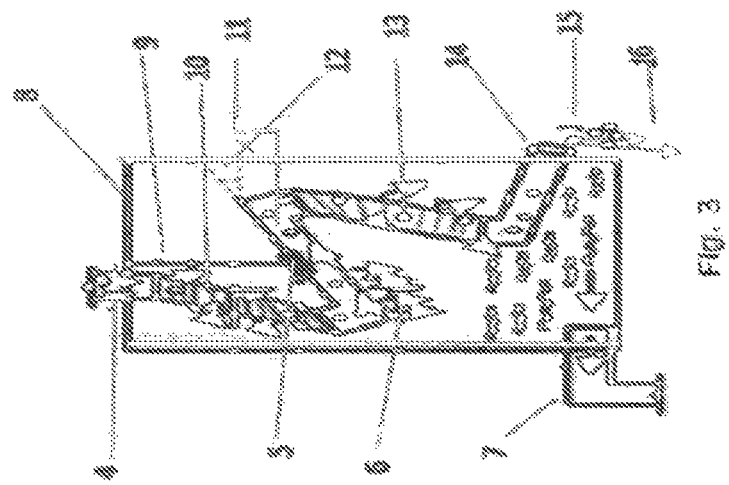

Even when the filtering device is tilted as in FIG. 3, as a consequence of a heavy flowrate of rainwater 3, all waste 15 will be expelled from the filtering device. The second filter element 11, as mentioned above, will always be in a flat or tilted position which is commanded by the flowrate of rainwater.

The shape and the mobility of the first, second and third filter elements (10, 11, 13), and the fact they have permeable walls, enable them to filter higher volumes of rainfall, even with abrupt changes, as compared with existing rainwater filters, which squander a much higher volume of rainwater. Moreover, as waste is totally expelled from the first, second and third filter elements (10, 11, 13), their capacity to filter rainwater is maintained for longer periods of time.

Filtering devices that do not have these characteristics waste a substantial part of the rainwater. Therefore, the filter separator and adapter for rainwater volume 8 provides a greater advantage in the art. The tilting calibrator 5 enables the adjustment and tilting of the second filter element 11, and consequently the retractable/expandable first and third filter elements (10, 13), according to the flow rate of rainwater 3 passing through them. The position where the rod 9 is pivotally connected to the second filter element 11 can be altered, to adjust to the flowrate of rainwater. Debris, dirt, leaves, insects, lizards or the like, which form the waste urged by the rainwater into the filter separator and adapter for rainwater volume 8, are always discarded through the waste outlet 14. Consequently, any piece of equipment which uses the filtered rainwater provided by the filter separator and adapter for rainwater volume 8 will not be hampered from operating by any waste.

The first, second and third filter elements (10, 11, 13) of the filter separator and adapter for rainwater volume 8 are fundamental for the safe operation of the system, as they prevent any waste from entering into water reservoirs or the like. Rainwater 3 is filtered, a flow of filtered water 6 is provided and drained through filtered water outlet 7, and waste 15 is discarded through waste outlet 14 with a small volume of discarded water 16.

Since waste is eliminated, losses are avoided to the system and to those who use it.

The invention claimed is:

1. Filter separator and adapter for rainwater volume including:
   a filtering device comprising first, second and third filter elements connected between them in sequence;
   a rainwater inlet which is connected to the first filter element;
   a waste outlet which is connected to the third filter element;
   the first, second and third filter elements having their walls made of a screen mesh;
   a filtered rainwater outlet provided at the lower part of the filter separator and adapter for rainwater volume;
   the first and the third filter elements being able to articulate, expand or retract according to the flow rate of rainwater passing through them;
   a tilting calibrator being provided in the upper part of the second filter element and pivotally connected to an end of a rod, the other end of the rod being pivotally connected to the upper part of the filter separator and adapter for rainwater volume, the assembly formed by the tilting calibrator, rod and the first, second and third filter elements designed to adapt to the flowrate of rainwater.

2. The filter separator and adapter for rainwater volume of claim 1 wherein the position where the rod is pivotally connected to the second filter element can be altered to adjust the filter separator and adapter for rainwater volume to the flowrate of rainwater.

3. A method for filtering rainwater comprising the steps of:
   collecting incoming rainwater from collectors;
   directing the flow of collected rainwater to a filter separator and adaptor for rainwater volume;
   allowing the flow of collected rainwater to pass through a rainwater inlet;
   next, allowing the flow of collected rainwater to pass through a filtering device comprising first, second and third filter elements connected in sequence and having their walls made of a screen mesh, said first and third filter elements being able to articulate, expand or retract according to the flow rate of rainwater passing through them;
   allowing the collected rainwater to pass through the interstices of the mesh, thereby causing a flux of filtered rainwater to drop into the bottom of the filter separator and adapter for rainwater volume;
   allowing said flow of filtered rainwater which drops into the bottom of the filter separator and adapter for rainwater volume to drain by means of a filtered rainwater outlet;
   allowing the assembly formed by a tilting calibrator pivotally fixed to the second filter element and connected to an end of a rod, whose other end is connected to the upper part of the filter separator and adaptor for rainwater volume, and the first, second and third filter elements designed to adapt to the flowrate of rainwater by expanding or retracting the first and third filter elements, thereby decreasing or increasing an angle of inclination of said second filter element;
   allowing the waste retained in the filtering device to be discarded through a waste outlet.

4. The method of claim 3, wherein the position where the rod is pivotally connected to the second filter element can be altered to adjust the filter separator and adaptor for rainwater volume to the flowrate of rainwater.

5. Filter separator and adapter for rainwater volume including:
   a filtering device able to make movements responsive to the flow rate of rainwater passing through it;
   a rainwater inlet connected to an upper end of the filtering device;
   a waste outlet connected to a lower end of the filtering device;
   at least one filtered rainwater outlet provided at a lower part of the filter separator and adapter for rainwater volume;
   a tilting calibrator provided in a middle section of the filtering device and pivotally connected to an end of a rod, the other end of the rod being pivotally connected to an upper part of the filter separator and adapter for rainwater volume; and
   the assembly formed by the tilting calibrator, rod and the filtering device being designed to adapt to the flowrate of rainwater.

6. The filter separator and adapter for rainwater volume of claim 5 wherein the filtering device comprises first, second and third filter elements connected between them in sequence.

7. The filter separator and adapter for rainwater volume of claim 6 wherein the first, second and third filter elements have their walls made of a screen mesh and the first and third filter elements are able to articulate, expand or retract according to the flow rate of rainwater passing through them.

8. The filter separator and adapter for rainwater volume of claim 7 wherein the tilting calibrator is pivotally connected to the filtering device in the second filter element at a position that can be altered to adjust the filter separator and adapter for rainwater volume to the flowrate of rainwater.

* * * * *